US006272435B1

(12) United States Patent
Ohanian

(10) Patent No.: US 6,272,435 B1
(45) Date of Patent: Aug. 7, 2001

(54) MIGRATION WITH DIPPING ACQUISITION PLANE SYSTEM AND METHOD

(75) Inventor: Vigen Ohanian, Bellaire, TX (US)

(73) Assignee: PGS Tensor, Inc., Houston, TX (US)

( * ) Notice: Subject to any disclaimer, the term of this patent is extended or adjusted under 35 U.S.C. 154(b) by 0 days.

(21) Appl. No.: 09/401,755

(22) Filed: Sep. 23, 1999

(51) Int. Cl.$^7$ .................................................. G01V 1/28
(52) U.S. Cl. .................................................................. 702/18
(58) Field of Search .............................. 367/73, 52, 53; 702/17, 18, 16, 14

(56) References Cited

U.S. PATENT DOCUMENTS

| | | |
|---|---|---|
| 4,363,113 | 12/1982 | Taner et al. . |
| 4,742,497 | * 5/1988 | Beasley et al. ........................ 367/52 |
| 4,797,861 | * 1/1989 | Beasley .................................. 367/50 |
| 5,150,332 | * 9/1992 | Bale et al. ............................. 367/73 |
| 5,500,832 | * 3/1996 | Berryhill .............................. 367/51 |
| 6,075,752 | * 6/2000 | De Bazelaire ........................ 367/59 |

FOREIGN PATENT DOCUMENTS

WO 97/13213    4/1997  (WO) .

OTHER PUBLICATIONS

Ohanian, V., Approximate Regimes of the H–F DMO Operator, 64$^{th}$ Ann. Internat. Mtg., Soc. Expl. Geophys., Expanded Abstracts, 1994, pp. 1533–1536.
Ohanian, V., DMO by The Huygens–Fresnel Diffraction Integral, 63$^{rd}$ Ann. Internat. Mtg., Soc. Expl. Geophys., Expanded Abstracts, 1993, pp. 1137–1140.
Ohanian, V., Analytic Properties of The F–K DMO Operator, 63$^{rd}$ Ann. Internat. Mtg., Soc. Expl. Geophys., Expanded Abstracts, 1993, pp. 1134–1136.
Dietrich, M. and Cohen, J., Migration to Zero Offset (DMO) for a Constant Velocity Gradient: an Analytical Formulation, Geophysical Prospecting 41, 1993, pp. 621–643.
Hale, D., Dip–moveout by Fourier transform, Geophysics, vol. 49, No. 6, Jun. 1984, pp. 741–757.
Deregowski, S.M., Dip–movement and Reflector Point Dispersal, Geophysical Prospecting 30, 1982, pp. 318–322.
Deregowski, S.M. and Rocca, F., Geometrical Optics and Wave Theory of Constant Offset Sections in Layered Media, Geophysical Prospecting, 1981, pp. 374–406.
Black, R., et al., Migration of Shallow Seismic Reflection Data, Geophysics, vol. 59, No. 3 (Mar., 1994); pp. 402–410.
Wiggins, J.W., Kirchhoff Integral Extrapolation and Migration of Nonplanar Data, Geophysics, vol. 49, No. 8 (Aug., 1984); pp. 1239–1248.

* cited by examiner

*Primary Examiner*—Donald E. McElheny, Jr.
(74) *Attorney, Agent, or Firm*—Arnold & Associates

(57) ABSTRACT

In one embodiment of the present invention, a method of generating a zero-offset trace, at a zero-offset location on a processing plane, for a time sampled recording is provided. The time sampled recording has a source and receiver, and a source coordinate and a receiver coordinate associated therewith. The time sampled recording also has an amplitude and a sampled time associated therewith. The method comprises reading the source and receiver coordinates and determining an ellipsoid dependant upon the source-receiver offset, the sampled time, and the velocity of the medium. The ellipsoid has the source as one focus and the receiver as the other focus. The method further comprises determining a set of normal points on the ellipsoid and determining the distance between each of the normal points and the zero-offset trace location and dividing twice the distance by the velocity of the medium, wherein the zero-offset travel time for each normal point is determined. The method further comprises assigning an amplitude to each zero-offset travel time, wherein a zero-offset trace is generated.

38 Claims, 9 Drawing Sheets

---

903 Reading the source coordinate and the receiver coordinate

904 Computing the source-receiver offset

905 Determining an ellipsoid

906 Determining a set of normal points

907 Determining a distance from the zero offset trace location and an associated normal point 908 Dividing the determined distance by the vrlocity of the medium 909 Assigning the amplitude

FIG. 3

- 903 Reading the source coordinate and the receiver coordinate
- 904 Computing the source-receiver offset
- 905 Determining an ellipsoid
- 906 Determining a set of normal points
- 907 Determining a distance from the zero offset trace location and an associated normal point
- 908 Dividing the determined distance by the vrlocity of the medium
- 909 Assigning the amplitude Geometry of angles ρ, φ and γ

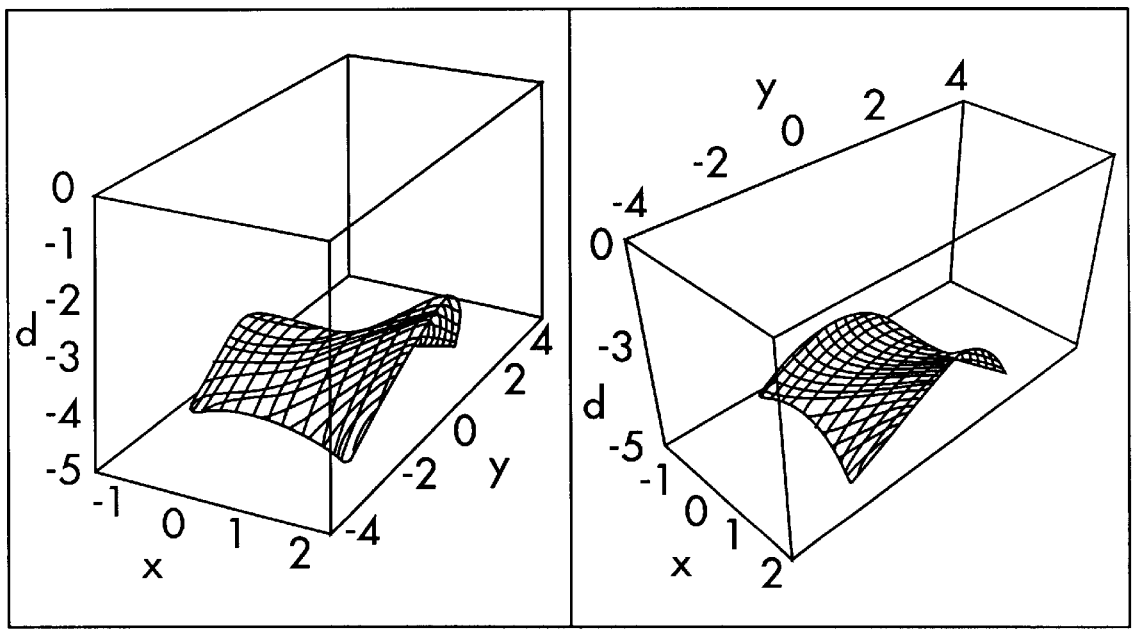

FIG. 6

| 703 Means for reading the source coordinate and the receiver coordinate |
|---|
| 704 Means for computing the source-receiver offset |
| 705 Means for determining an ellipsoid |
| 706 Means for determining a set of normal points |
| 707 Means for determining a distance from the zero offset trace location and an associated normal points |
| 708 Means for dividing the determined distance by the velocity of the medium |
| 709 Means for assigning an amplitude |

FIG. 7

MIGRATION WITH DIPPING ACQUISITION PLANE SYSTEM AND METHOD

BACKGROUND OF THE INVENTION

Migration to zero offset (MZO), alternatively known as the combined procedures of normal moveout and dip moveout (NMO/DMO), is a technique by which reflection data from a finite source and receiver offset is mapped to corresponding zero-offset traces. The MZO processes that are currently used are inadequate for a number of reasons. First, an inherent problem with current MZO processes is that they assume the source and the receiver are located in the same horizontal plane, called the acquisition plane. This assumption is almost invariably incorrect. Actually, the introduction of a rather small vertical source and receiver offset can introduce serious error in current MZO impulse responses. Furthermore, in ocean bottom seismic (OBS), or even land surveys with a deep borehole, there is a large vertical offset which is inherent to the survey. In these situations, assuming that the source and the receiver are in the same acquisition plane is simply not feasible.

Alternatively, to deal with a large vertical offset, current MZO processes shift the source and receiver to a common plane, called the datum plane. This is often called datumming or redatumming. Such conventional techniques result in a large amount of error and are extremely unreliable. Current techniques make this unreliable shift because they are without an acceptable and accurate alternative.

Thus, with the increasing importance of vertical cable and ocean bottom seismic (OBS) technologies, vertical offsets between the sources and receivers deployed in field acquisitions are significant, and must be formally accounted for in the MZO processes used in seismic processing.

There is a long felt need for a method of generating zero-offset traces from offset data, which does not shift the source and receiver to a common datum plane, and which does not presume a source-receiver pair in an acquisition plane. The present work fulfills this long felt need.

SUMMARY OF THE INVENTION

In one embodiment of the present invention, a method of generating a zero-offset trace, at a zero-offset location on a processing plane, for a time sampled recording is provided. The time sampled recording has a source and a receiver, and a source coordinate and a receiver coordinate associated therewith. The source and receiver coordinates have a non-zero vertical offset associated therewith. The time sampled recording also has an amplitude and a sampled time associated therewith. The method comprises reading the source and receiver coordinates and computing a source-receiver offset from the source and receiver coordinates. The method further comprises determining an ellipsoid dependant upon the source-receiver offset, the sampled time, and the velocity of the medium. The ellipsoid has the source as one focus and the receiver as the other focus. The method further comprises determining a set of normal points on the ellipsoid, wherein a line from the zero-offset trace location to the ellipsoid is normal to the tangent of the ellipsoid at each of the normal points. The method further comprises determining the distance between each of the normal points and the zero-offset trace location and dividing twice the distance by the velocity of the medium, wherein the zero-offset travel time for each normal point is determined. The method further comprises assigning an amplitude to each zero-offset travel time, wherein a zero-offset trace is generated.

In an even further embodiment of the present invention, a method of generating a zero-offset trace, at a zero-offset location, for a time sampled recording is provided. The time sampled recording has a source location and receiver location associated therewith. The method comprises determining a reflecting surface and determining a set of normal points on the reflecting surface. A line from the zero-offset trace location to the reflecting surface is normal to the tangent of the reflecting surface. The method further comprises determining the distance between the zero-offset trace location and a normal point and dividing twice the distance by the velocity of the medium, wherein the zero- offset travel time for each normal point is determined. The method further comprises assigning an amplitude to each zero-offset travel time, wherein a zero-offset trace is generated.

In still a further embodiment of the present invention, a system of generating a zero-offset trace, at a zero-offset location on a processing plane, for a time sampled recording is provided. The time sampled recording has a source and receiver, and a source coordinate and a receiver coordinate associated therewith. The time sampled recording also has an amplitude and a sampled time associated therewith. The system comprises a means for reading the source and receiver coordinates. The source and receiver coordinates have a non-zero vertical offset associated therewith. The system further comprises a means for computing a source-receiver offset from the source and receiver coordinates and a means for determining an ellipsoid dependant upon the source-receiver offset, the sampled time, and the velocity of the medium. The ellipsoid has the source as one focus and the receiver as the other focus. The system further comprises a means for determining a set of normal points on the ellipsoid, wherein a line from the zero-offset trace location to the ellipsoid is normal to the tangent of the ellipsoid at each of the normal points. The system further comprises a means for determining the distance between each of the normal points and the zero-offset trace location and a means for dividing twice the distance by the velocity of the medium, wherein the zero-offset travel time for each normal point is determined The system further comprises a means for assigning an amplitude to each zero-offset travel time, wherein a zero-offset trace is generated.

In still a further embodiment, a system of generating a zero-offset trace, at a zero-offset location, for a time sampled recording is provided. The time sampled recording has a source location and receiver location associated therewith. The system comprises a means for determining a reflecting surface and a means for determining a set of normal points on the reflecting surface. A line from the zero-offset trace location to the reflecting surface is normal to the tangent of the reflecting surface. The system further comprises a means for determining the distance between the zero-offset trace location and a normal point, and a means for dividing twice the distance by the velocity of the medium, wherein the zero-offset travel time for each normal point is determined. The system further comprises a means for assigning an amplitude to each zero-offset travel time, wherein a zero-offset trace is generated.

BRIEF DESCRIPTION OF THE FIGURES

FIG. 3 is flowchart of one embodiment of the present invention.

FIG. 6 a three dimensional diagram of one aspect of an MZO impulse response associated with one aspect of the present invention.

FIG. 7 is a flowchart of one embodiment of the present invention.

DETAILED DESCRIPTION OF EXAMPLE EMBODIMENTS OF THE INVENTION

Figure 1:
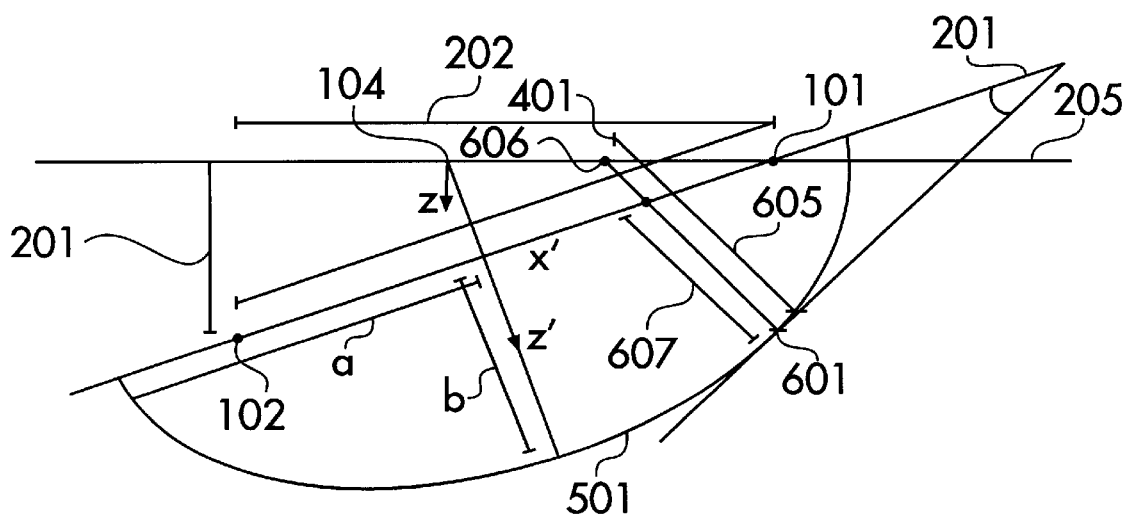
FIG. 1 is a cross-sectional view of one aspect of the present invention.

Referring now to FIG. 1, an example embodiment of the present invention is seen. Here, a method of generating a zero-offset trace at a zero-offset trace location (401) for a time sampled recording (301) is provided. The set of zero-offset traces associated with a single finite offset experiment, is commonly called the impulse response. In the illustrated example a complete seismic trace is processed based on the impulse response.

Figure 4:
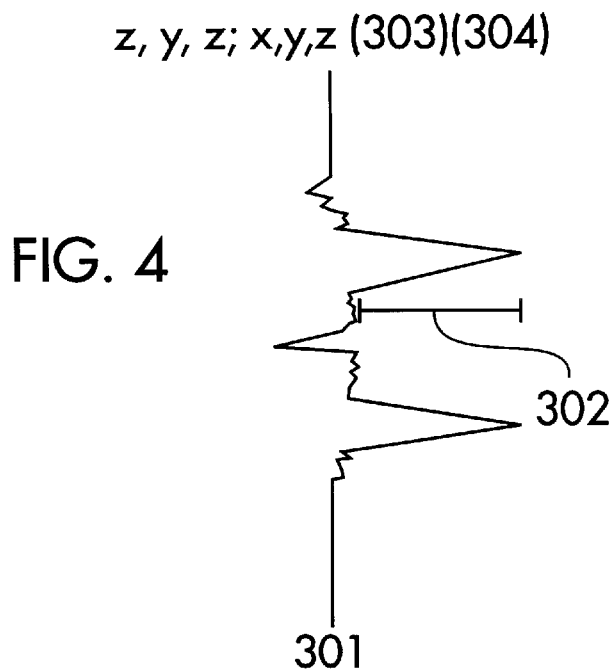
FIG. 4 is an example diagram of a time sampled recording.

Turning now to FIG. 4, the time sampled recording (301) is the recording of a seismic signal generated by a seismic source (101) which has been received by a seismic receiver (102). Typical receivers include hydrophones, geophones, accelerometers, or any other receiver that will occur to one of ordinary skill in the art. Typical sources include air guns, dynamite, vibrators, or any other source that will occur to one of ordinary skill in the art. The time sampled recording (301) has a source coordinate (304) and a receiver coordinate (303) associated therewith. The source coordinate (304) and the receiver coordinate (303) are commonly available on the trace header as illustrated in FIG. 4. As shown in cross-section in FIG. 1, the source (101) and the receiver (102) have different elevations, causing a vertical offset (201) in the data. The source (101) and receiver (102) are also located some distance from one another horizontally, causing the data to have a horizontal offset (202). As shown in FIG. 4, the time sampled recording (301) further comprises an amplitude (302). This amplitude (302) represents the energy of the reflected seismic wave.

Figure 2:
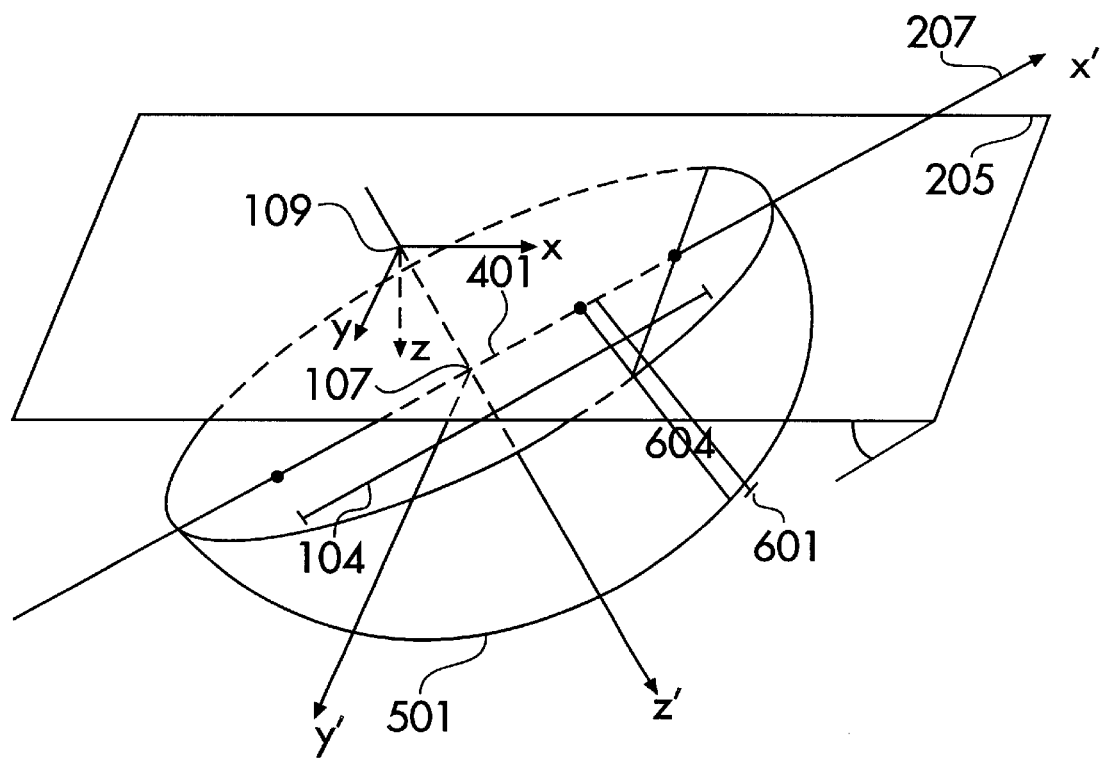
FIG. 2 is a three dimensional view of one aspect of the present invention.

As illustrated in FIG. 2, a set of zero-offset trace locations (401) are located on a processing plane (205). The zero-offset trace location (401) indicates the point on the processing plane (205) that a particular zero-offset trace will be generated. In one embodiment, the processing plane (205) represents the surface in the field. For some ocean bottom embodiments, or some streamer seismic embodiments, the processing plane (205) represents the surface of the water. In alternate land embodiments, the processing plane (205) represents the surface of the earth. Of course, in further embodiments, the processing plane (205) is selected to represent some other plane or simply a convenient datum.

In one example embodiment of the present invention, the zero-offset location (401) is chosen by a person who desires a zero-offset trace at a location (401), to be derived from finite offset data (301). In alternate embodiments of the present invention, the zero-offset trace locations (401) are chosen or presumed by a grid definition specified by the user. The general impulse response, discussed below, allows the presumption or choice of the point (401) on the processing plane (205) that a zero-offset trace is desired because the impulse response generates zero-offset traces at all points on the plane (205).

As illustrated in FIG. 3, one example method embodiment of the present invention comprises reading (903) the source coordinate (304) and the receiver coordinate (303). The source to receiver offset (104) is then computed from the source (304) and receiver coordinates (303). In one embodiment, the source coordinate (304) and receiver coordinate (303) are read (903) into a computer using trace header information originally read via GPS (Global Positioning System) or any other method of determining source (101) and receiver (102) locations that will occur to one of ordinary skill in the art. In other embodiments, the offset (104) is read (903) directly in the field by a person in the field, or in still further embodiments, from the data itself (300). In even further embodiments, the offset (104) is known or based on a priori knowledge of the source location (101) or receiver location (102), or the source location (101) and receiver location (102) are laid out in accordance with a desired vertical (201) and horizontal (202) offset. In even further embodiments, the source-receiver offset (104) is computed using Pythagorus' Theorem from the horizontal (202) and vertical offset (201) or by any other method that will occur to one of ordinary skill in the art.

The example method embodiment of FIGS. 1 and 2 further comprises determining (905) a reflecting surface (501), which in the illustrated embodiment is an ellipsoid (501). The ellipsoid (501) is dependant upon the horizontal (202) and vertical offsets (201), the velocity of propagation of the seismic wave in the earth, and the time of the sampled recording (301). In alternate embodiments, other shapes for the reflecting surface (501) are contemplated according to the present invention, depending upon the particular subsurface model desired by the user. With varying velocity models and subsurface structures, circular, parabolic, tangential or even flat reflectors are more appropriate. One example method uses the velocity of the medium through which the seismic wave travels. For example, in one embodiment of the present invention, velocity models obtained from regional data are used. In other embodiments, velocity models are determined through NMO techniques, tomography techniques, and other techniques that will occur to one of ordinary skill in the art, without further explanation. In still another alternate embodiment, the velocity is provided through a priori knowledge of the region.

As illustrated in FIG. 1, in cross-section, and FIG. 2, in three dimensions, the ellipsoid (501) has the source point (101) at one of its foci and the receiver point (102) at its other focus. As will be apparent to one of ordinary skill in the art, all possible reflection points from a source (101) to a receiver (102) at an offset (104), $2f$, in a uniform velocity medium, v, having the same travel time, t, form an ellipsoid of revolution (501). In other words, the ellipsoid (501) represents all possible theoretical reflection locations for the seismic signal from the source (101) arriving at the receiver (102) at the sampled travel time, at least for a simplified earth model. The ellipsoid (501) has a major and minor axes, a and b respectively; where, $2a=vt$. v represents the velocity of the medium. This is the velocity of a seismic wave traveling in this medium. In some embodiments, this is the velocity of the earth. In other embodiments it is the velocity of the water, or in some ocean bottom embodiments, an average velocity of the medium through which the seismic wave propagates is used. This includes air, water, earth, and other materials as will occur to one of ordinary skill in the art. t represents the sampled time. The major axis of the ellipsoid, a is located along the source/receiver line (207). The minor axis b, is given by the formula $b=\sqrt{a^2-f^2}$, and is perpendicular to the major axis a. Many methods of determining an ellipsoid are available, and the invention is not limited to any particular method. For example, in alternate embodiments, mathematical methods, computational methods, and programs that run on computers are available for the computation of the coordinates of the ellipsoid (501) and are known to those of ordinary skill in the art without further explanation. The same is true for models based on shapes other than ellipsoids. Users of the present invention may use an alternate embodiment employing a circular, parabolic, flat, or any other shape reflector without departing from the present invention.

Figure 5:
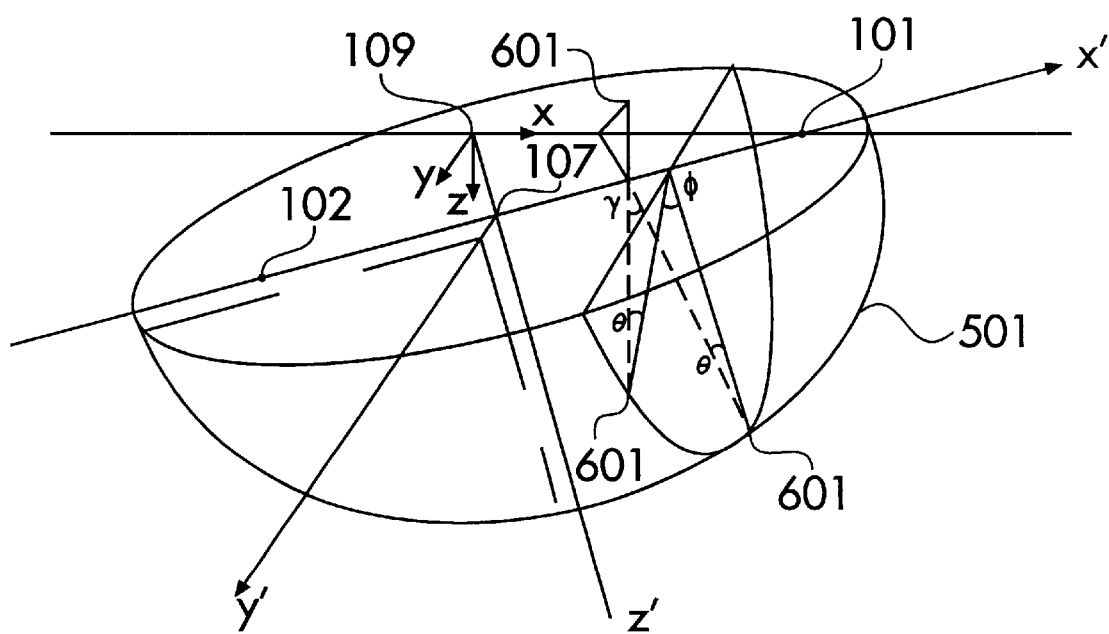
FIG. 5 is a three dimensional view of one aspect of the present invention.

The example method illustrated in FIGS. 1 and 2, further comprises determining (906), for each of the zero-offset trace locations (401), a set of normal points (601) on the ellipsoid (501). The normal points (601) are points wherein a line (604) from the zero-offset trace location (401) to the ellipsoid (501) is normal to the ellipsoid (501). As will be appreciated by one of ordinary skill in the art, there is more than one normal point (601) on the surface of the ellipsoid (501) which corresponds with each zero-offset trace location (401). It will be further appreciated by one of ordinary skill in the art, as shown in FIG. 5, that this normal point (601) represents the point of reflection of a zero-offset trace, if one were to be generated at the zero-offset trace location (401). In alternate embodiments, these normal points are determined by computer programs, computational methods, or any other method that will occur to one of ordinary skill in the art. In even further embodiments, normal points (601) are determined on reflecting surfaces other than ellipsoids.

The example method of FIGS. 1 and 2 further comprises determining (907) the distance (605) between the zero-offset trace location (401) and the normal points (601) associated with that zero-offset trace location (401). This distance (605) represents one half the travel path of the zero-offset trace to be generated. As shown in FIG. 1, this distance (605) is the sum of a distance (606) from the zero-offset trace location (401) to the source-receiver line (207) plus a distance (607) from the source-receiver line (207) to the normal point (601). This distance is expressed by the following equation d+Δd, discussed more fully below. In alternate embodiments, the determining (907) is performed using computer programs, computational methods, or any other method that will occur to one of ordinary skill in the art.

The example method of FIGS. 1 and 2 her comprises dividing (908) twice the determined distance (605) by the velocity of the medium, wherein the zero-offset travel time for each normal point (601) is determined. This zero-offset travel time represents the time of travel of a seismic wave from the presumed zero-offset trace location (401) to the reflecting surface (501) and back to the presumed zero-offset trace location (401). The illustrated method further comprises assigning (909) an amplitude associated with the zero-offset travel time, wherein a zero-offset trace is generated. The assigned (909) amplitude (not illustrated) is dependent on the determined distance (605). Such assigning an amplitude (909) is appreciated by those of ordinary skill in the art without further explanation. For a further discussion of such assigning (909) an amplitude, see Vigen Ohanian, Thomas M. Snyder, & Daniel P. Hampson, *Approximate Regimes of the H-F DMO Operator*, 64rd Ann. Internat. Mtg., Soc. Expl. Geophys., Expanded Abstracts, 1533–1536, Appendix (B-4) (1994), incorporated herein by reference. As will be apparent to one of ordinary skill in the art, the sampled amplitude (302) is modified in some embodiments, although not necessarily all, to account for spherical divergence, obliquity, and other geometric issues which will occur to one of ordinary skill in the art, without further explanation.

In a further example embodiment of the present invention, a formulation of the zero-offset trace, is a direct generalization of the following equations:

$$x(\theta) = \frac{(a^2-b^2)\sin\theta}{\sqrt{a^2\sin^2\theta + b^2\cos^2\theta}},$$

$$d(\theta) = \frac{b^2}{\sqrt{a^2\sin^2\theta + b^2\cos^2\theta}}.$$

These two equations govern the zero-offset trace for data with source and receiver horizontal offset (202) but no vertical offset (201). As illustrated in FIG. 5, θ, φ, and γ, represent the angles of geometry in the ellipsoid (501). The major axis is a, and b is the minor axis (503). These equations are discussed in detail in the following publications: Vigen Ohanian, Thomas M. Schneider, & Ananda Gunawardena, *Analytic Properties of the F-K DMO Operator*, 63rd Ann. Internat. Mtg., Soc. Expl. Geophys., Expanded Abstracts, 1134–1136 (1993); Vigen Ohanian, DMO by *The Huygens-Fresnel Diffraction Integral*, 63rd Ann. Internat. Mtg., Soc. Expl. Geophys., Expanded Abstracts, 1137–1140 (1993); Vigen Ohanian, Thomas M. Snyder, & Daniel P. Hampson, *Approximate Regimes of the H-F DMO Operator*, 64rd Ann. Internat. Mtg., Soc. Expl. Geophys., Expanded Abstracts, 1533–1536 (1994), all of which are incorporated herein by reference. The above-mentioned impulse response is a two dimensional parametric formulation of the MZO impulse response which makes use of the symmetry inherent to the problem. In still further embodiments, this formula is expanded to include situations where the source (101) and receiver (102) have a vertical offset (201). Referring again to FIG. 5, the following relationship exists among angles θ, φ, and γ: $\cos(\gamma)=\cos^2(\theta)\cos(\phi)+\sin^2(\theta)$. In one embodiment of the present invention, and illustrated in both FIG. 1 and FIG. 5, the primed axes, (x',y',z') are fixed in the body of the ellipsoid (501), whereas, the unprimed axes, (x,y,z) represent the coordinate system within which the zero-offset trace is computed. The origin (107) of the primed system is halfway between the source location (101) and the receiver location (102). The origin (109) of the unprimed system, is the intersection point of the x axis and the z' axis. It is to be noted, and FIG. 1 demonstrates, that the vertical planes xz and x'z' coincide with each other and contain the source/receiver line (207). The y and y' axes are parallel to each other and are normal to this vertical plane.

Next, as illustrated in FIGS. 1, 2, and 5, the distance Δd is computed in one embodiment as:

$$\Delta d(\theta) = \frac{f\tan(\alpha)}{\cos(\theta)} - \frac{\sin(\alpha)}{\cos(\theta)}x'(\theta),$$

where x'(θ) is tie distance from the origin (107) of the primed system to the intersection of the source-receiver line (207) and the line (604) between the zero-offset trace location (401) and the normal point (601)(609). x'(θ) is equivalent, in one embodiment, to untilted x(θ), discussed above. ƒ is ½ the source-receiver offset (104). θ, α, γ are angles of geometry within the system, as will occur to those of ordinary skill in the art without further explanation. In an even further embodiment, an amplitude is assigned dependent upon the following equation: A≈(a²d⁴(Θ) Cos (Θ))/(b⁴d'(Θ)).

In a further embodiment, a zero-offset trace is generated at any zero-offset trace location (401). In this embodiment, the following expressions for the impulse response will generate all of the zero-offset traces associated with a single source-receiver experiment. A zero-offset trace produced by an impulse response is chosen at the zero-offset trace location (401). FIG. 6 illustrates a three-dimensional example picture of one aspect of the impulse response of one example embodiment. This illustrated impulse response is governed by 3 equations:

$$x(\theta) = \frac{x'(\theta) - f\tan(\alpha)\tan(\theta)}{\cos(\alpha) - \sin(\alpha)\tan(\theta)}$$

$$y(\theta, \phi) = \frac{\phi}{|\phi|}\Delta d(\theta)\tan(\gamma),$$

and $$d(\theta, \phi) = d'(\theta) + \frac{\Delta d(\theta)}{\cos(\gamma)}.$$

Where:

d'(θ) is the normal distance between the ellipsoid (501) and the source-receiver line (207). ƒ is ½ the source receiver offset (104). d is the distance between the zero-offset trace location (401) and the normal point (601). x'(0) is the distance from the origin (107) of the primed system to the intersection of the source receiver line (207) and the line (604) between the zero-offset trace location (401) and the normal point (601). As stated above, θ, α, and γ are angles related to the geometry of the problem and are understood by those of ordinary skill in the art without further explanation.

In alternate embodiments, the impulse response uses approximations for any of the angles represented. As is well known to those of ordinary skill in the art, for example, as an angle (e.g. α) gets small, sin a essentially equals both tan α and α. Thus, geometrical approximations are used with some embodiments of the present invention without departing from the invention.

In still further alternate embodiments, the impulse response may also be expressed in Cartesian coordinates. This formulation of the MZO-xyz problem is based on explicit relationships between end-point coordinates of normal incident rays extending from the reflecting surface (501) to the processing plane (205). In this illustrated embodiment the surface (501) comprises an ellipsoid (501). Referring to the primed coordinate system in FIG. 1 and FIG. 2, the (x,y) plane, otherwise referred to as the processing plane (205), has a slope m=tan(α). Thus, with respect to the primed system, a zero-offset trace location (401) on the processing plane (205) satisfies the following relationship: z=m(x–ƒ). Again, referring to the primed system a vector from a zero-offset trace location (401) on the processing plane (205), with Cartesian coordinates (x,y,z), to a point on the ellipsoid (501), with coordinates (x',y'z'), can be expressed as follows:

$$\vec{V} = (x'-x)\hat{i} + (y'-y)\hat{j} + (z'-z)\hat{k}$$

By requiring this vector to be normal to the surface of the ellipsoid (501), the following relationships can be established:

$$x = \frac{f(fz' - mb^2)x'}{a^2z' - mb^2x'}$$

$$y = \frac{a^2}{b^2}\left(\frac{x}{x'} - \frac{f^2}{a^2}\right)y'.$$

Now, for points (x', y', z) on the ellipsoid we have:

$$z' = b\sqrt{1 - \frac{x'^2}{a^2} - \frac{y'^2}{b^2}}$$

Thus, using the above equations, normal distances (605) between the normal points (601) and the zero-offset trace location (401) may be computed:

$$d(x,y) = \sqrt{(x'-x)^2 + (y'-y)^2 + (z'-z)^2}.$$

Figure 8:
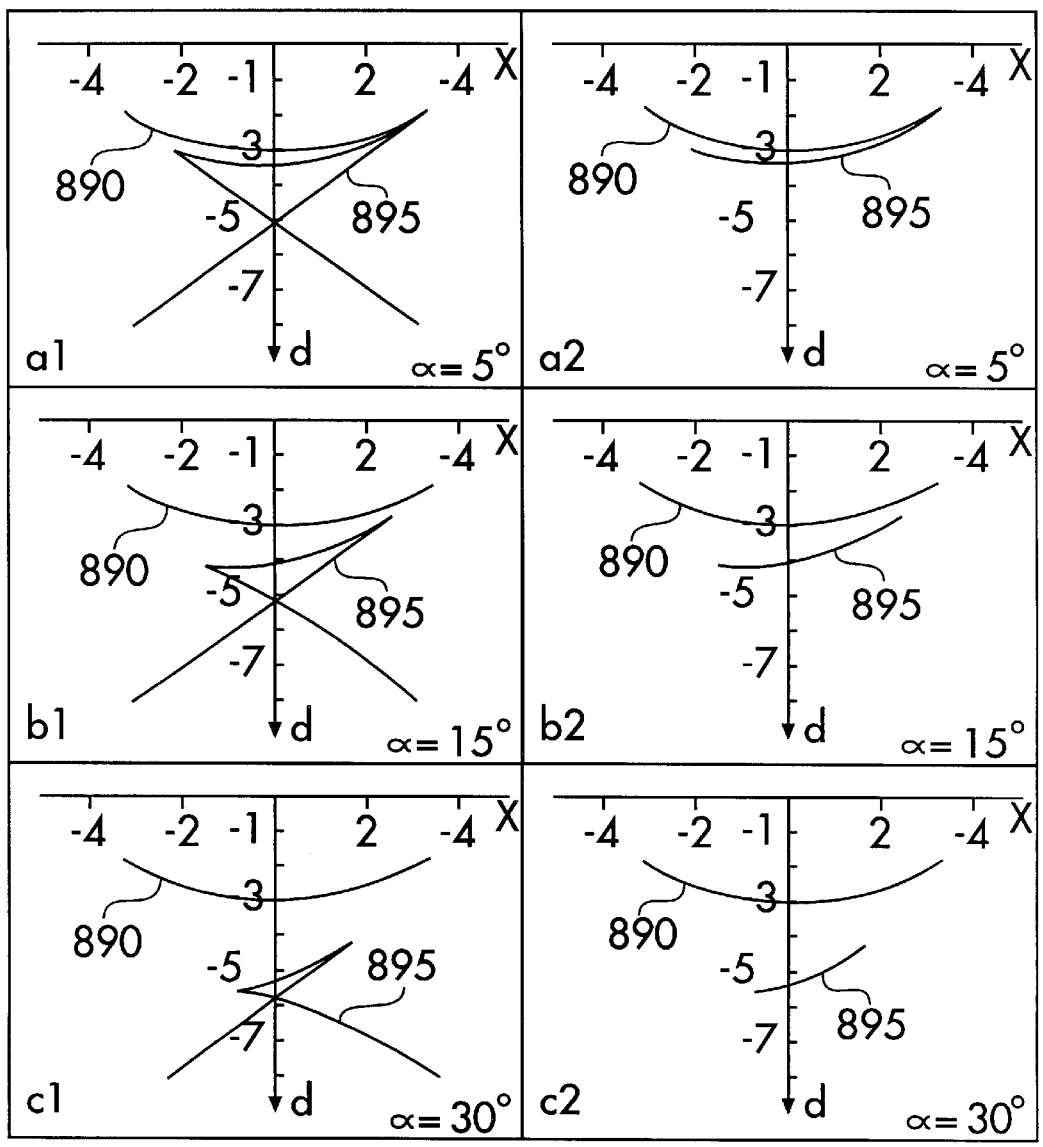
FIG. 8 is a cross-sectional view of one aspect of an MZO impulse response associated with the present invention.

As illustrated in FIG. 8, in some alternate embodiments, impulse responses for different source and receiver vertical offsets (201) are varied. FIG. 8 shows the inline response (y=0) (895) for different values of α. These response curves are multi-valued. Furthermore, as the vertical offset (201) increases, α increases. For comparison, the conventional MZO impulse response (890) is shown in the background of each figure. Impulse responses in the first row were generated using α=5°. In the middle pair, the value of α=15° was used. The third pair uses α=30°. These are examples using one embodiment of the present invention. The two curves in each row differ in their apertures. By narrowing the aperture, certain wide-angle normal-incident rays are cut off from the impulse response. In FIG. 8, a1, b1, and c1 show full-aperture impulse responses for corresponding angles α. These response curves are multi-valued and exhibit triplications. On the other hand, FIG. 8-a2, 8-b2, and 8-c2 have limited apertures, allowing only near vertical ray paths. Triplications are reduced in these limited aperture response curves. Inline impulse responses in FIG. 8 with source/receiver vertical offset (201) has the effect of tilting the response toward the source (101). Furthermore, unlike the conventional MZO, the impulse response of one embodiment the present invention is now multi-valued.

Figure 9:
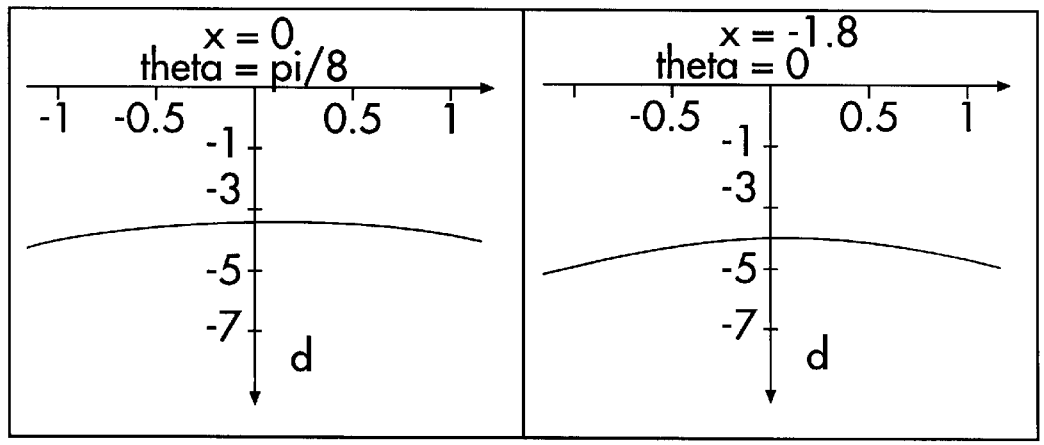
FIG. 9 is a cross-sectional view of another aspect of an MZO impulse response associated with the present invention.
Figure 10:
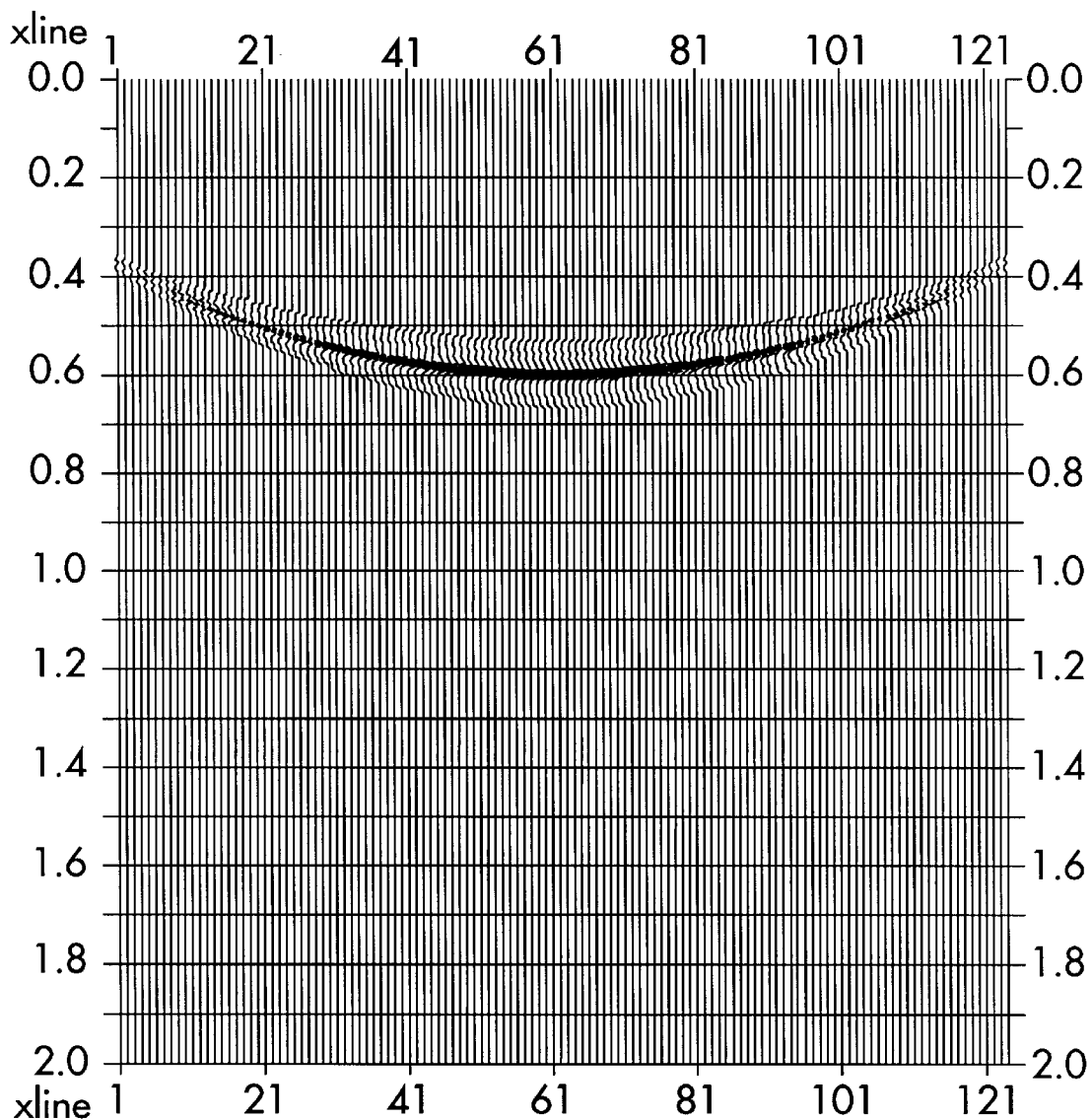
FIG. 10 is a view of one aspect of an MZO impulse response associated with the present invention.
Figure 11:
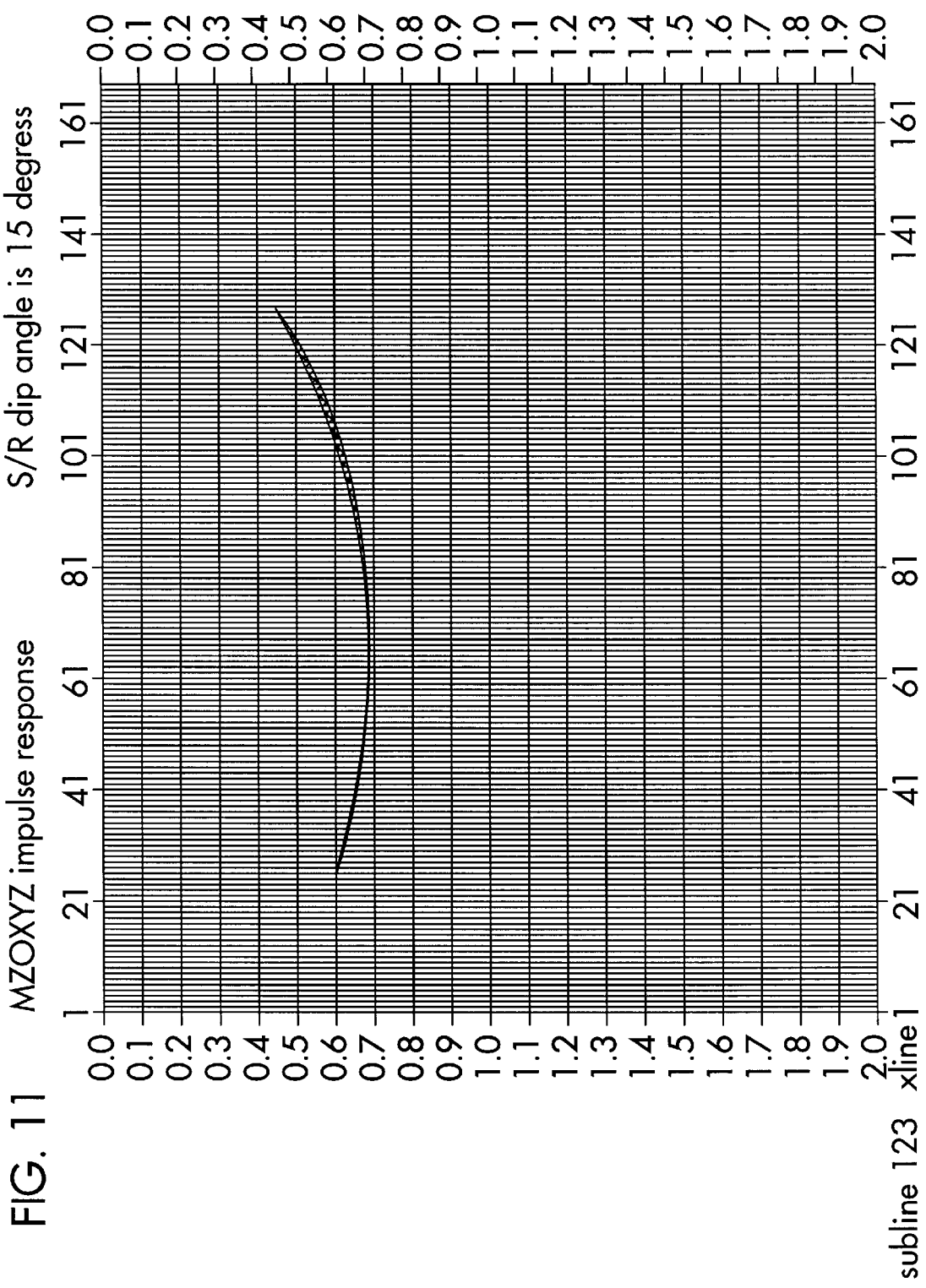
FIG. 11 is a view of one aspect of an MZO impulse response associated with the present invention.
Figure 12:
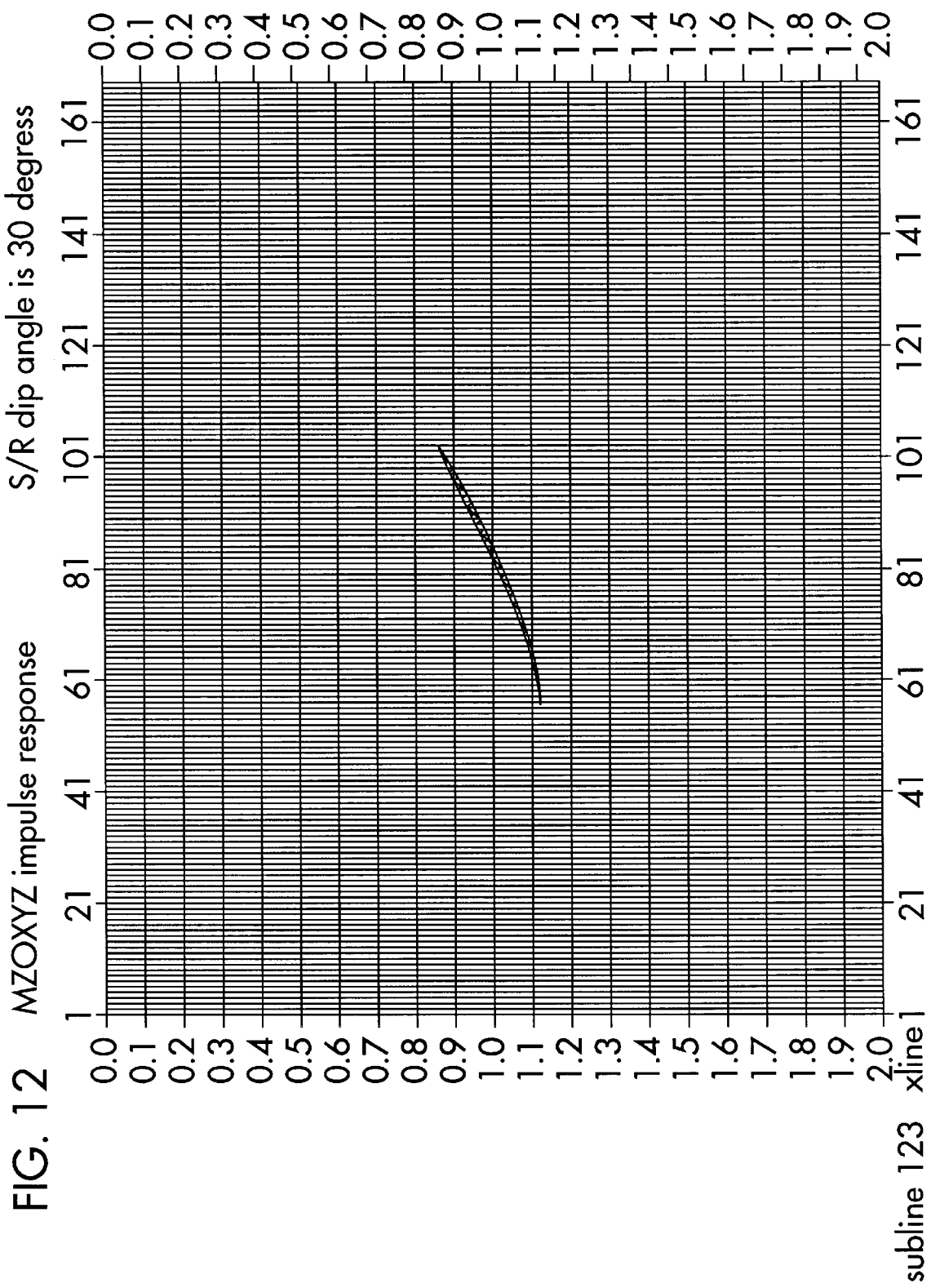
FIG. 12 is a view of one aspect of an MZO impulse response associated with the present invention.
Figure 13:
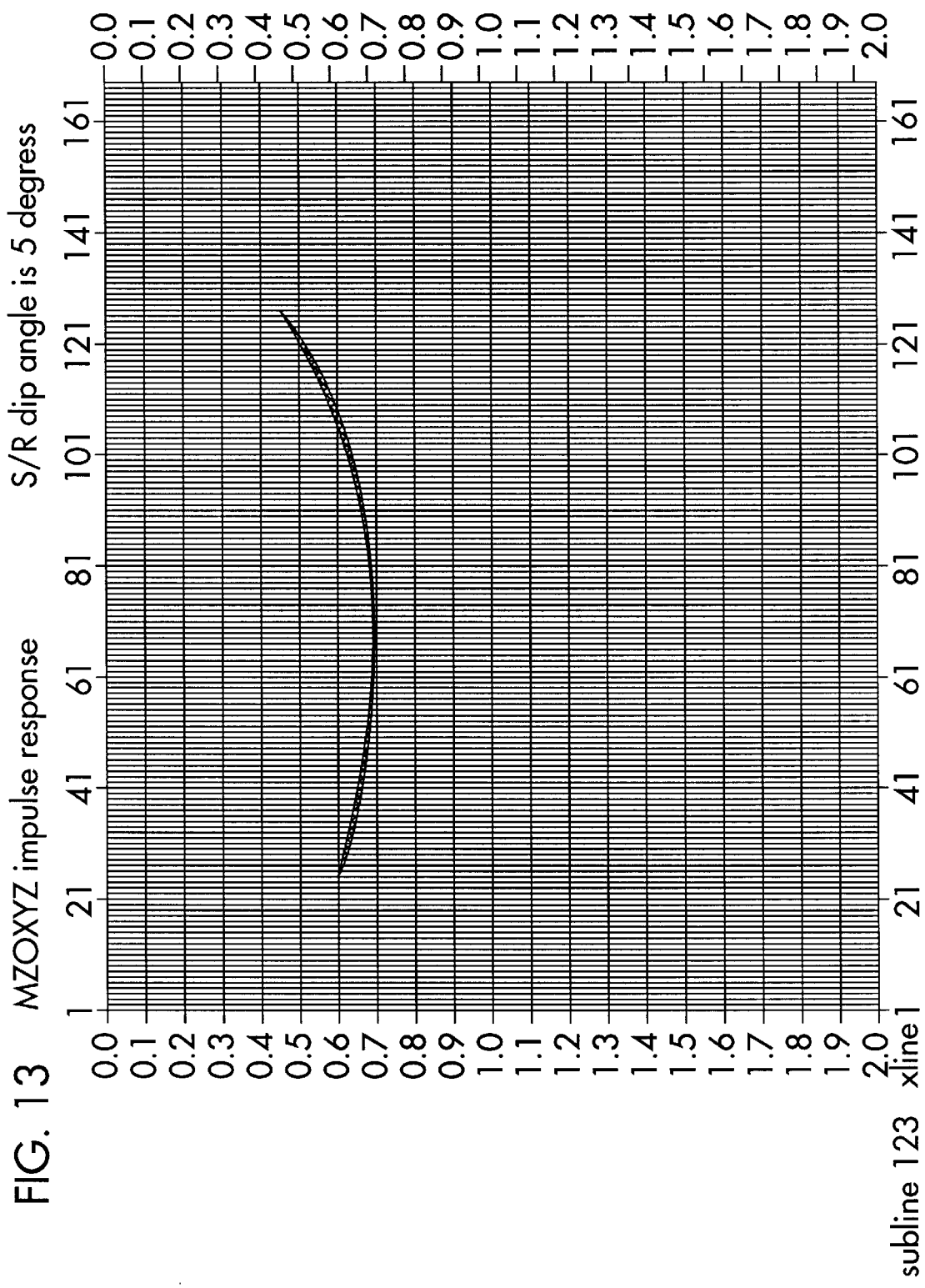
FIG. 13 is a view of one aspect of an MZO impulse response associated with the present invention.

FIG. 9 shows an embodiment of the present invention in which cross-sections through the impulse response surface for two different cross-line values are illustrated. FIG. 9a corresponds to x=0 and FIG. 9b corresponds to x=−7/4ƒ.

FIGS. 10–13 illustrate the examples of FIG. 8 when amplitude is included in the impulse response. In further embodiments of the present invention, amplitude is included causing the secondary events to be weak. In even further embodiments, because these secondary events are weak, aperture limitation is not necessary.

The above-described embodiments of the present invention allow a zero-offset trace to be generated at any zero-offset trace location (401) on the processing plane (205) from offset (201)(202) data. However, different offset data can produce zero-offset traces that will correspond to the same zero-offset trace location (401). In other words, another source-receiver experiment will yield a zero-offset trace in the same location (401). By repeating this process and by stacking traces that occur at the same location, according to another aspect of the present invention, a grand zero-offset stacked section is generated. In further embodiments of the present invention, many zero-offset traces associated with many source/receiver experiments are stacked. By stacking many zero-offset traces, noise is reduced, while the signal will be enhanced.

In a further embodiment of the present invention, a system is provided for generating a zero-offset trace at a zero-offset trace location (401) for a time sampled recording (301). The time sampled recording (301) has a source coordinate (304) and receiver coordinate (303) associated therewith. The source (101) and receiver (102) have non-zero vertical (201) and horizontal offsets (202). The time sampled recording (301) further comprises an amplitude (302).

The system further comprises a means for reading (703) the source coordinate and the receiver coordinate (303). In some example embodiments, means (703) comprises computer hardware adapted to read the source coordinates (304) and receiver coordinates (303) from trace headers. Such computers and hardware are widely available and will occur to those of ordinary skill in the art without further explanation.

The system further comprises a means for computing (704) the source to receiver offset (104) from the source (304) and receiver coordinates (303). In various embodiments, programs and subroutines running on computer hardware compute the source-receiver offset (104) from the source coordinate (304) and receiver coordinate (303) which were read into the computer by the various means of reading (703) discussed above. Of course, in simpler embodiments, the means for computing (704) the source-receiver offset (104) comprises a calculator.

The system further comprises a means for determining (705) a reflecting surface (501). In the illustrated example, this surface (501) is an ellipsoid (501) dependant upon the source to receiver horizontal (202) and vertical offsets, (201) the sampled time, and the velocity. In one embodiment, a means (705) for determining the ellipsoid are programs and subroutines that compute the coordinates of the surface of the ellipsoid (501) from offset (201)(202), sample time, and velocity. Such programs and subroutines run on computers widely available to those of ordinary skill in the art without further explanation. In various embodiments, the means (706) for determining a reflecting surface are computers, programs and subroutines which will determine a reflecting surface (501) of various shapes such as circular, parabolic, flat, or other surfaces, based on user specified criteria such as, for example, velocity of the medium, offset, acoustic impedance, and other geophysical criteria.

The system further comprises a means for determining (706), for each of the zero- offset trace locations (401), a set of normal points (601) on the ellipsoid (501) or other reflecting surface, wherein a line (604) from the zero-offset trace location (401) to the ellipsoid (501) is normal to the tangent of the ellipsoid (501). In various embodiments such means for determining (706) normal points (601) are programs and subroutines that compute the normal points (601). In one embodiment computer programs designed to attempt many lines connecting the zero-offset trace location (401) to the reflecting surface (501) will use trial and error until those which are normal to the tangent of the reflecting surface (501) are found. Such programs and subroutines run on computers widely available to those of ordinary skill in the art without further explanation. Alternate embodiments may use mathematical programs or computers as means (706) for determining. Of course, in simpler embodiments means (706) comprises a calculator.

The system further comprises a means for determining (707) the distance (604) between each of the normal points (601) and the zero-offset trace location (401) associated with each of the normal points (601). In various embodiments such means for determining (707) the distance (604) are programs and subroutines that compute the distance (604).

Such programs and subroutines run on computers widely available to those of ordinary skill in the art without further explanation. In alternate embodiments, means (707) comprises programs which use trial and error, or simply a calculator, or any other means (707) that will occur to one of ordinary skill in the art.

The system further comprises a means for dividing (708) twice the determined distance (604) between each of the normal points (601) and the zero-offset trace location (401) associated with each of the normal points (601) by the velocity of the medium, wherein the zero-offset travel time for each normal point (601) is determined. In various embodiments such means for dividing (708) are programs and functions that divide. In a simpler embodiment, once the distance and the velocity are known a simple calculator comprises the means (708). In alternate embodiments, programs and subroutines run on computers are means (708) widely available to those of ordinary skill in the art without explanation.

The method further comprises means for assigning (709) an amplitude associated with the zero-offset time, wherein a zero-offset trace is generated. In various embodiments, such means for assigning an amplitude (709) are programs and subroutines that compute and assign amplitudes in accordance with the above discussed criteria. Such programs and subroutines run on computers widely available to those of ordinary skill in the art without explanation.

In a further embodiment, a means for generating an impulse response is provided. Such means for generating an impulse response comprise various programs and subroutines which implement the following three equations.

$$x(\theta) = \frac{x'(\theta) - f\tan(\alpha)\tan(\theta)}{\cos(\alpha) - \sin(\alpha)\tan(\theta)}$$

$$y(\theta, \phi) = \frac{\phi}{|\phi|}\Delta d(\theta)\tan(\gamma),$$

and $$d(\theta, \phi) = d'(\theta) + \frac{\Delta d(\theta)}{\cos(\gamma)}.$$

Where:

d'(θ) is the normal distance between the ellipsoid (501) and the source receiver line (207). $f$ is ½ the source receiver offset (507). x'(θ) is the distance from the origin (107) of the primed system to the intersection of the source receiver line (207) and the line (604) between the zero-offset trace location (401) and the normal point (601)(609). d is the distance between the zero-offset trace location (401) and the normal point (601). As above, θ, α and γ are angles of related to the geometry of the problem, and are understood by those of ordinary skill in the art without further explanation.

In further embodiments, the means implements an impulse response expressed in Cartesian coordinates according to:

$$x = \frac{f(fz' - mb^2)x'}{a^2z' - mb^2x'};$$

$$y = \frac{a^2}{b^2}\left(\frac{x}{x'} - \frac{f^2}{a^2}\right)y';$$

$$z' = b\sqrt{1 - \frac{x'^2}{a^2} - \frac{y'^2}{b^2}};$$

$$d(x,y) = \sqrt{(x'-x)^2 + (y'-y)^2 + (z'-z)^2}.$$

Such means for generating and implementing this impulse response are computers and subroutines which will occur to one of ordinary skill in the art without further explanation. Of course, the means comprises a calculator in a simple embodiment.

In a further embodiment, a means for stacking zero-offset traces is provided. In various embodiments, such means include programs and subroutines run on computer hardware which will add multiple zero-offset traces together generated from various source/receiver experiments. The superposition of the various traces will allow the signal to be enhanced, while noise is reduced.

The above described embodiments of the present invention, are merely illustrative and are in no way meant to be exhaustive of the scope of the present invention.

I claim:

1. A method of generating a zero-offset trace, at a zero-offset location on a processing plane, for a time sampled recording, the time sampled recording having a source and receiver associated therewith, the time sampled recording having a source coordinate and a receiver coordinate associated therewith, the time sampled recording having an amplitude and a sampled time associated therewith, the method comprising:

reading the source and receiver coordinates; wherein the source and receiver coordinates have a non-zero vertical offset associated therewith;

computing a source-receiver offset from the source and receiver coordinates;

determining an ellipsoid dependant upon the source-receiver offset, the sampled time, and the velocity of the medium, the ellipsoid having the source as one focus and the receiver as the other focus;

determining a set of normal points on the ellipsoid, wherein a line from the zero-offset trace location to the ellipsoid is normal to the tangent of the ellipsoid at each of the normal points;

determining the distance between each of the normal points and the zero-offset trace location;

dividing twice the distance by the velocity of the medium, wherein the zero-offset travel time for each normal point is determined; and assigning an amplitude to each zero-offset travel time; wherein a zero-offset trace is generated.

2. The method of claim 1, wherein said reading further comprises entering the source coordinate and the receiver coordinate in a computer.

3. The method of claim 2, wherein said entering further comprises digitizing the source coordinate and the receiver coordinate in a computer.

4. The method of claim 1, wherein said computing a source receiver offset further comprises:

determining a horizontal offset associated with the source coordinate and the receiver coordinate;

determining a vertical offset associated with the source coordinate and receiver coordinate; and taking the square root of the sum of the vertical offset squared and the horizontal offset squared.

5. The method of claim 1, wherein said determining an ellipsoid further comprises determining an ellipsoid which is tilted with respect to the processing plane.

6. The method of claim 1, wherein said determining an ellipsoid further comprises determining a major axis and determining a minor axis.

7. The method of claim 6, wherein said major axis comprises one half the velocity of the medium multiplied by the sampled time.

8. The method of claim 6, wherein said minor axis comprises the square root of the sum of the major axis squared and one half the source-receiver offset squared.

9. The method of claim 1, wherein said determining the distance further comprises determining a distance essentially corresponding to:

$$d(\theta, \phi) = d'(\theta) + \frac{\Delta d(\theta)}{\cos(\gamma)};$$

wherein:

d' is a distance between the ellipsoid and a source-receiver line;

Δd comprises a distance from the source-receiver line to the zero-offset trace location; and θ, γ, and φ are angles of geometry.

10. The method of claim 1, further comprising generating an impulse response.

11. The method of claim 10, wherein the impulse response comprises:

a function associated with an x-coordinate;

a function associated with a y-coordinate; and a function associated with a distance;

wherein the function associated with an x-coordinate is dependent upon:

$$x(\theta) = \frac{x'(\theta) - f\tan(\alpha)\tan(\theta)}{\cos(\alpha) - \sin(\alpha)\tan(\theta)};$$

wherein the function associated with a y-coordinate is dependent upon:

$$y(\theta, \phi) = \frac{\phi}{|\phi|} \Delta d(\theta) \tan(\gamma);$$

and wherein the function associated with a distance is dependent upon:

$$d(\theta, \phi) = d'(\theta) + \frac{\Delta d(\theta)}{\cos(\gamma)}.$$

wherein:

d' is a distance between the ellipsoid and a source-receiver line;

Δd comprises a distance from the source-receiver line to the zero-offset trace location;

x' comprises a distance;

f comprises one half the source-receiver offset;

and θ, φ, and γ are angles of geometry.

12. The method of claim 10, wherein the impulse response comprises:

a function associated with an x-coordinate;

a function associated with a y coordinate;

a function associated with a z'-coordinate; and a function associated with a distance; wherein the function associated with the x-coordinate comprises:

$$x = \frac{f(fz' - mb^2)x'}{a^2z' - mb^2x'}$$

the function associated with the y-coordinate comprises:

$$y = \frac{a^2}{b^2}\left(\frac{x}{x'} - \frac{f^2}{a^2}\right)y'.$$

the function associated with the z'-coordinate comprises:

$$z' = b\sqrt{1 - \frac{x'^2}{a^2} - \frac{y'^2}{b^2}}$$

and;
the function associated with a distance comprises:
d(x,y)=√(x'-x)²+(y'-y))²+(z'-z)²; wherein
x, y and z comprises points in Cartesian coordinates with respect to a processing plane;
x', y' and z' comprises coordinate points in Cartesian coordinates with respect to the reflecting surface;
a comprises the major axis of an ellipsoid;
b comprises the minor axis of an ellipsoid; and
f comprises one half the source-receiver offset.

13. A method of generating a zero-offset trace, at a zero-offset location, for a time sampled recording having a source location and receiver location associated therewith, the method comprising:
   determining a reflecting surface;
   determining a set of normal points on the reflecting surface; wherein a line from the zero-offset trace location to the reflecting surface is normal to the tangent of the reflecting surface;
   determining the distance between the zero-offset trace location and a normal point;
   dividing twice the distance by the velocity of the medium, wherein the zero-offset travel time for each normal point is determined; and
   assigning an amplitude to each zero-offset travel time;
   wherein a zero-offset trace is generated.

14. The method of claim 13, wherein said determining a reflecting surface further comprising determining a reflecting surface dependent upon the source location and the receiver location.

15. The method of claim 14, wherein said determining a reflecting surface further comprises determining an essentially ellipsoid reflecting surface.

16. The method of claim 13, wherein said determining a reflecting surface further comprises determining an essentially circular reflecting surface.

17. The method of claim 13, wherein said determining a reflecting surface further comprises determining an essentially parabolic reflecting surface.

18. The method of claim 13, wherein said determining a reflecting surface further comprises determining an essentially flat reflecting surface.

19. The method of claim 13, wherein said determining a reflecting surface further comprises determining a reflecting surface dependent upon the velocity of the medium.

20. A system of generating a zero-offset trace, at a zero-offset location on a processing plane, for a time sampled recording, the time sampled recording having a source and receiver associated therewith, the time sampled recording having a source coordinate and a receiver coordinate associated therewith, the time sampled recording having an amplitude and a sampled time associated therewith, the system comprising:
   a means for reading the source and receiver coordinates; wherein the source and receiver coordinates have a non-zero vertical offset associated therewith;
   a means for computing a source-receiver offset from the source and receiver coordinates;
   a means for determining an ellipsoid dependant upon the source-receiver offset, the sampled time, and the velocity of the medium, the ellipsoid having the source as one focus and the receiver as the other focus;
   a means for determining a set of normal points on the ellipsoid, wherein a line from the zero-offset trace location to the ellipsoid is normal to the tangent of the ellipsoid at each of the normal points;
   a means for determining the distance between each of the normal points and the zero-offset trace location;
   a means for dividing twice the distance by the velocity of the medium, wherein the zero-offset travel time for each normal point is determined; and
   a means for assigning an amplitude to each zero-offset travel time;
   wherein a zero-offset trace is generated.

21. The system of claim 20, wherein said a means for reading further comprises a means for entering the source coordinate and the receiver coordinate in a computer.

22. The system of claim 21, wherein said a means for entering flirther comprises a means for digitizing the source coordinate and the receiver coordinate in a computer.

23. The system of claim 20, wherein said a means for computing a source receiver offset further comprises:
   a means for determining a horizontal offset associated with the source coordinate and the receiver coordinate;
   a means for determining a vertical offset associated with the source coordinate and receiver coordinate; and
   a means for taking the square root of the sum of the vertical offset squared and the horizontal offset squared.

24. The system of claim 20, wherein said a means for determining an ellipsoid further comprises a means for determining an ellipsoid which is tilted with respect to the processing plane.

25. The system of claim 20, wherein said a means for determining an ellipsoid further comprises a means for determining a major axis and a means for determining a minor axis.

26. The system of claim 25, wherein said a means for determining a major axis comprises a means for computing one half the velocity of the medium multiplied by the sampled time.

27. The system of claim 25, wherein said a means for determining a minor axis comprises a means for computing the square root of the sum of the major axis squared and one half the source receiver offset squared.

28. The system of claim 20, wherein said a means for determining the distance further comprises a means for determining a distance essentially corresponding to:

$$d(\theta, \phi) = d'(\theta) + \frac{\Delta d(\theta)}{\cos(\gamma)};$$

wherein:

d' is a distance between the ellipsoid and a source-receiver line;

Δd comprises a distance from the source-receiver line to the zero-offset trace location; and θ, γ, and φ are angles of geometry.

29. The system of claim 20, further comprising a means for generating an impulse response.

30. The system of claim 29, wherein the impulse response comprises:

a function associated with an x-coordinate;

a function associated with a y-coordinate; and a function associated with a distance;

wherein the function associated with an x-coordinate is dependent upon:

$$x(\theta) = \frac{x'(\theta) - f\tan(\alpha)\tan(\theta)}{\cos(\alpha) - \sin(\alpha)\tan(\theta)};$$

wherein the function associated with a y-coordinate is dependent upon:

$$y(\theta, \phi) = \frac{\phi}{|\phi|} \Delta d(\theta)\tan(\gamma);$$

and wherein the function associated with a distance is dependent upon:

$$d(\theta, \phi) = d'(\theta) + \frac{\Delta d(\theta)}{\cos(\gamma)}.$$

wherein:

d' is a distance between the ellipsoid and a source-receiver line;

Δd comprises a distance from the source-receiver line to the zero-offset trace location;

x' comprises a distance;

$f$ comprises one half the source receiver offset; and θ, φ, and γ are angles of geometry.

31. The method of claim 29, wherein the impulse response comprises:

a function associated with an x-coordinate;

a function associated with a y coordinate;

a function associated with a z'-coordinate; and a function associated with a distance; wherein the function associated with the x-coordinate comprises:

$$x = \frac{f(fz' - mb^2)x'}{a^2z' - mb^2x'}$$

the function associated with the y-coordinate comprises:

$$y = \frac{a^2}{b^2}\left(\frac{x}{x'} - \frac{f^2}{a^2}\right)y'.$$

the function associated with the z'-coordinate comprises:

$$z' = b\sqrt{1 - \frac{x'^2}{a^2} - \frac{y'^2}{b^2}}$$

and;

the function associated with a distance comprises:

$d(x,y)=\sqrt{(x'-x)^2+(y'-y)^2+(z'-z)^2}$; wherein x, y and z comprises points in Cartesian coordinates with respect to a processing plane;

x', y' and z' comprises coordinate points in Cartesian coordinates with respect to the reflecting surface;

a comprises the major axis of an ellipsoid;

b comprises the minor axis of an ellipsoid; and f comprises one half the source-receiver offset.

32. A system of generating a zero-offset trace, at a zero-offset location, for a time sampled recording having a source location and receiver location associated therewith, the system comprising:

a means for determining a reflecting surface;

a means for determining a set of normal points on the reflecting surface; wherein a line from the zero-offset trace location to the reflecting surface is normal to the tangent of the reflecting surface;

a means for determining the distance between the zero-offset trace location and a normal point;

a means for dividing twice the distance by the velocity of the medium, wherein the zero-offset travel time for each normal point is determined; and a means for assigning an amplitude to each zero-offset travel time;

wherein a zero-offset trace is generated.

33. The system of claim 32, wherein said a means for determining a reflecting surface further comprises a means for determining a reflecting surface dependent upon the source location and the receiver location.

34. The system of claim 33, wherein said a means for determining a reflecting surface further comprises a means for determining an essentially ellipsoid reflecting surface.

35. The system of claim 32, wherein said a means for determining a reflecting surface further comprises a means for determining an essentially circular reflecting surface.

36. The system of claim 32, wherein said a means for determining a reflecting surface further comprises a means for determining an essentially parabolic reflecting surface.

37. The system of claim 32, wherein said a means for determining a reflecting surface further comprises a means for determining an essentially flat reflecting surface.

38. The system of claim 32, wherein said a means for determining a reflecting surface further comprises a means for determining a reflecting surface dependent upon the velocity of the medium.

\* \* \* \* \*

UNITED STATES PATENT AND TRADEMARK OFFICE
CERTIFICATE OF CORRECTION

PATENT NO. : 6,272,435 B1
DATED : August 7, 2001
INVENTOR(S) : Vigen Ohanian

It is certified that error appears in the above-identified patent and that said Letters Patent is hereby corrected as shown below:

Column 1,
Line 11, "First" should be indented

Column 3,
Line 3, "FIG. 6 a" should be -- FIG. 6 is a --

Column 5,
Line 7, "ellipsoid, a" should read -- ellipsoid, a, --
Line 7, "minor axis b," should read -- minor axis, b, --

Column 7,
Line 44, "sin a essentially" should read -- sin α essentially --

Column 14,
Line 32, "flither" should read -- further --

Figure, 3,
Block 6, "vrlocity" should read -- velocity --

Signed and Sealed this

Twenty-sixth Day of February, 2002

JAMES E. ROGAN
*Director of the United States Patent and Trademark Office*

*Attest:*

*Attesting Officer*